United States Patent [19]

Tasaki

[11] Patent Number: 4,891,769

[45] Date of Patent: Jan. 2, 1990

[54] PRINTER HAVING PRIORITIZED ON-LINE AND OFF-LINE MODES

[75] Inventor: Shigemitsu Tasaki, Kawasaki, Japan

[73] Assignee: Canon Kabushiki Kaisha, Tokyo, Japan

[21] Appl. No.: 38,712

[22] Filed: Apr. 15, 1987

[30] Foreign Application Priority Data

Apr. 18, 1986 [JP] Japan .................................. 61-89681
Apr. 24, 1986 [JP] Japan .................................. 61-95484

[51] Int. Cl.$^4$ ............................................ G01D 15/00
[52] U.S. Cl. ........................................ 364/519; 101/2; 346/33 R
[58] Field of Search ................................ 364/518–520; 400/124, 114; 346/33 R, 154; 101/2, 226

[56] References Cited

U.S. PATENT DOCUMENTS 4,326,813 4/1982 Limicka, Jr. et al. .............. 400/124
4,694,405 9/1987 Bradbury et al. .................. 364/518
4,698,755 10/1987 Okazaki et al. ..................... 364/519

*Primary Examiner*—Emanuel S. Kemeny
*Assistant Examiner*—H. R. Herndon
*Attorney, Agent, or Firm*—Fitzpatrick, Cella, Harper & Scinto

[57] ABSTRACT

A printer which receives data and commands which are transferred from a data processing apparatus serving as an external apparatus such as a host computer and prints the data. This printer includes a setting circuit to set information regarding the printing; this setting circuit having a first mode in which the information regarding the printing can be designated irrespective of the information from the external apparatus and a second mode in which the information regarding the printing is designated on the basis of the information from the external apparatus. A deciding circuit to decide whether the information regarding the printing has been set to predetermined information by the setting circuit or not and a control unit for controlling the printer in a manner such that the priority is given to the first mode when the information regarding the printing has been set to information other than the predetermined information on the basis of the decision of the deciding means. Thus the data can be easily printed at the print pitch and printing mode in response to commands from the host computer by the simple operations.

10 Claims, 6 Drawing Sheets

PRINTER HAVING PRIORITIZED ON-LINE AND OFF-LINE MODES

BACKGROUND OF THE INVENTION

1. Field of the Invention

The present invention relates to a printer for receiving and printing data and commands which are transferred from a data processing apparatus constituted as an external apparatus such as a host computer (including a word processor main body) or the like.

2. Related Background Art

Hitherto, in printers for printing data transferred from the host computer, the host computer produces software in which the printing mode, print pitch, line feed pitch, sheet feed amount and the like are changed in accordance with the object of the user. The host transfers the software together with the data, thereby obtaining a desired print output.

Namely, when the user wants to obtain various kinds of print output or wants to change a part of the previous print output format, or the like, the program of the host computer needs to be newly produced or the previous program needs to be newly made again.

For example, the software of the host computer must be changed in the following cases: the case where the data which previously was printed and output in the draft mode (the mode to print data for drafting in which the printing quality may slightly deteriorate) is now intended to be printed and output with a high quality in the NLQ (near letter quality mode, i.e., the printing mode or slightly higher quality), LQ mode (letter quality mode which is, the high quality printing mode), or the like; the case where the print pitch is changed from pica pitch (10 cpi) to elite pitch (12 cpi) in accordance with the change in print format or the like; or the case where the line feed pitch is changed from 1/6 inch to ⅛ inch; and the like.

With respect to the foregoing points, the printer is provided with a key to switch among the draft print, NLQ print, and the like and keys to switch the print pitch and line feed pitch. The printing mode and the other pitches are switched by these keys. Further, the apparatus is switched such that no command is input from the host computer. Only the data is received and executed by the apparatus.

The printing mode, pitch, and the like switched by the printer side are reset to the print mode, pitch, and the like in response to an initial signal and designation commands of the different printing mode, pitch, and the like which are output from the host computer. Therefore, the printing mode, pitch, and the like which are designated and input by the keys are cancelled.

In this case, when the user designates the printing mode, pitch, and the like by operating the keys, this means that the user wants to execute the printing on the basis of the printing mode and the like designated by the key inputs irrespective of the printing mode and the like designated by the host computer. Therefore, if the printing mode and the like designated by the user are switched by the commands which are generated from the host computer, an inconvenience will occur since the switched printing mode and the like are different from the user's requirements.

In particular, the pica pitch of 10 cpi and the draft printing mode are generally used in the printer (standard mode). When the print pitch and printing mode are designated by commands from the host computer, another pitch and printing mode are ordinarily designated by these commands. For example, in many cases, the operator desires to continuously print by designating the pitch of 12 cpi and NLQ mode.

Namely, it is demanded that the printer having advanced functions is further used in a desired mode designated at the printer (at the position of the user) or can be used in the mode which is designated at the host computer side. It is further demanded that such a printer can be easily and effectively used.

In such conventional recording apparatus, when an initial signal (INIT signal) to initialize the recording apparatus is input from the host side, a predetermined printing mode, print pitch, and the like are set similarly to the case when the power supply of the recording apparatus is turned on. Simultaneously, the print buffer, input buffer, flags, and the like are cleared and the I/O port is set.

On the other hand, in a recording apparatus whose function can be set by the keyboard, namely, in the recording apparatus in which the printing mode such as draft (ordinary printing), NLQ (near letter quality), or the like, the print pitch, and the like are merely designated by the keyboard without using commands from the host side, for example, in the case where the print output mode is limited for use in only the printer to output sentences, the function can be easily conveniently set from the keyboard. If the software is constituted in such a manner that, when inputting from the keyboard, the data is transferred from the host side after the initial signal is output, there is an inconvenience in that the printing mode which has previously been set from the keyboard is cleared. In addition, there is the problem that the operation becomes complicated, since the printing mode, print pitch, and the like must be reset every time the data is output.

On the other hand, in output formats from the host side, there is a format such that after the printer is once reset, a command is transferred. In the case of making the printer operative by such software, the problem which is caused in the case where the printing is controlled by the function of the keyboard is particulary likely to occur.

SUMMARY OF THE INVENTION

It is an object of the present invention to eliminate the foregoing drawbacks in consideration of the foregoing points.

Another object of the invention is to provide a printer having a first mode in which the information regarding the printing can be directly designated irrespective of the data from a control unit and a second mode in which the information regarding the printing is designated on the basis of the data from the control unit, the printer being capable of properly switching between the first and second modes.

Still another object of the invention is to provide a printer in which, when the standard mode (the printing mode which is ordinarily used) is designated by inputting a key thereon, a command from a host computer is again made valid, thereby enabling the printing to be performed by the designation using a command from the host computer.

Still another object of the invention is to provide a printer which is constituted in a manner such that keys to designate a print pitch and the like are provided on an operation panel, and in which, when the power supply is turned on, a special printing mode, print pitch and the like which are ordinarily used in general printers are automatically set. If only the data is transferred from a host computer in this state, the printing is executed in accordance with the designation from the operation panel. On the other hand, if commands to change the printing mode, print pitch, and the like are transferred, the printing is executed in the printing mode, print pitch, and the like which are changed by these commands.

In the case where the operator wants to print in a printing mode and with a print pitch different from a printing mode and with a print pitch which are ordinarily used, the transfer of commands from the host computer is validated.

Still another object of the invention is to provide a printer which is constituted in a manner such that by switching the printer from the on-line mode to the off-line mode, the key input from the operation panel is validated. In addition, in the case where the data from the host is to be printed by setting the printer to the on-line mode after the printing mode and print pitch other than the standard printing mode and print pitch are designated by the key inputs, the printing mode and print pitch which are designated by the commands from the host are ignored in favor of the printing mode and print pitch designated by the key inputs.

Still another object of the invention is to provide a printer which is constituted in a manner such that the operation to give priority to a command which is transferred from the host side over the function designated from the keyboard, and the operation to allow various kinds of printing modes which are input from the keyboard to be executed irrespective of the command from the host side, can be switched by a switch. when this switch is set to a position to give priority to the function which is designated from the keyboard, even if an initial signal to reset the recording apparatus is input from the host side, the mode to give priority to the keyboard function is not cleared and the set mode is continued without being cancelled.

Still another object of the invention is that in a display section, which can receive the information regarding the printing in the off-line mode and which displays this information, the data indicative of whether the input information has been input or not is displayed in correspondence to the display content of the display section being switched or not, and when the printer is set to the on-line mode, it is informed whether the printer is made operative on the basis of the information regarding the printing from the host side or on the basis of the input information.

BRIEF DESCRIPTION OF THE DRAWINGS

FIG. 1-2 is an explanatory diagram of a printer section according to the invention;

FIG. 2 is an enlarged diagram of an operation panel;

FIG. 3-1 is a control block diagram of a system for allowing a first embodiment of the present invention to function;

FIG. 3-2 is a diagram showing a second embodiment of the present invention;

DETAILED DESCRIPTION OF THE PREFERRED EMBODIMENTS

The present invention will now be described hereinbelow with respect to a first embodiment.

Figure 1:
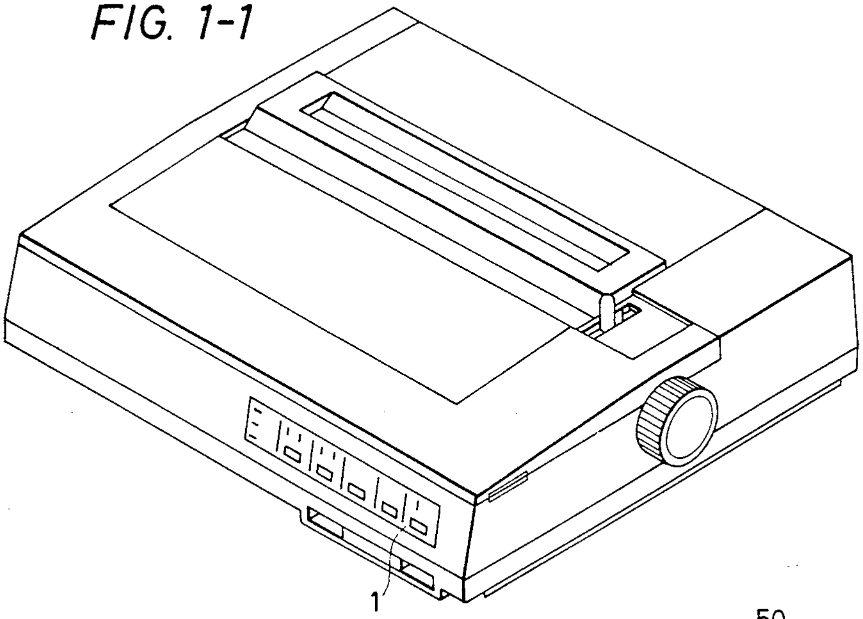
FIG. 1-1 is an external view of apparatus according to the present invention.

FIG. 1-1 is an external view of a printer according to the invention. Reference numeral 1 denotes an operation panel. Since the outside appearance of the other components is the same as in an ordinary printer, their detailed descriptions are omitted.

Figures 1, 2:
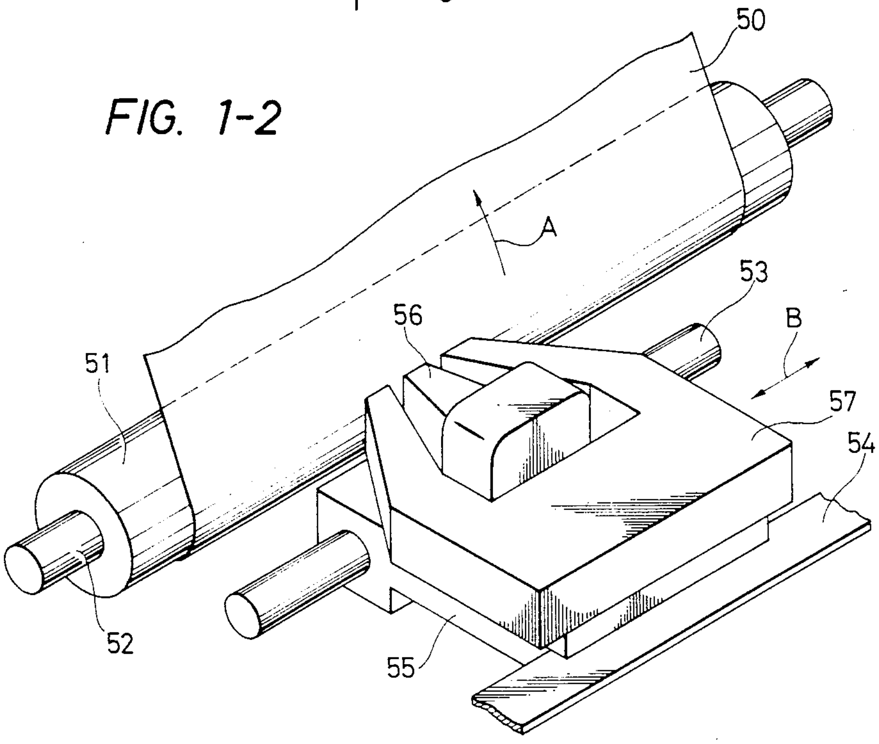
Figure 2:
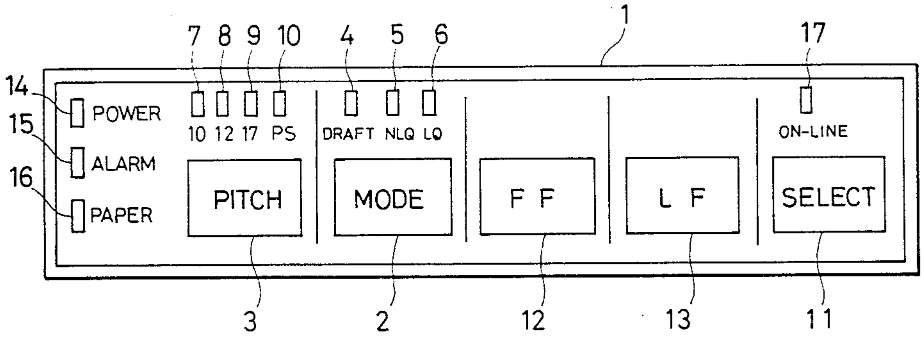

FIG. 1-2 is a schematic perspective view showing an example of a printing section of a printer suitable to embody the invention.

In FIG. 1-2, a sheet (recording medium) 50 such as paper, thin plastic plate, or the like is wound around a platen 51 and is guided by its peripheral surface and conveyed in the direction indicated by an arrow A. The platen 51 also serves as a feed roller which is rotated through a platen shaft 52 by a driving source (not shown).

A guide shaft 53 and a guide rail 54 are arranged in front of the platen 51 in parallel therewith. A carriage 55 is guided and supported by the guide shaft and guide rail and reciprocated in the directions indicated by arrows B by a driving source (not shown).

A recording head 56 is mounted onto the carriage 55. Data is recorded onto the sheet 50 while driving the recording head synchronously with the movement of the carriage 55.

A plurality of (e.g., 24 or 32) dot forming means are disposed on the front surface of the recording head 56. An example of the recording apparatus of the wire-dot type is shown. An ink ribbon cassette 57 for copy transfer is attached on the carriage 55.

FIG. 2 is an enlarged diagram of the operation panel 1 according to the invention. The operation panel 1 is provided with: a mode key 2 to designate a printing mode; a pitch key 3 to designate a print pitch; and various kinds of mode lamps 4, 5, and 6 and pitch lamps 7, 8, 9, and 10 to indicate the mode and pitch which are designated by the mode key 2 and pitch key 3. The operation panel 1 is further provided with: a selection key 11 to switch between the on-line mode and the off-line mode; a form feed (FF) key 12 to feed a sheet (for example, to instruct the feed of a sheet on a page unit basis); a line feed (LF) key 13 to instruct the feed of a sheet line by line; a power lamp 14 to indicate the turned-on state of the power supply; an alarm lamp 15 to indicate an abnormal state of the printer; a paper lamp 16 to indicate that no paper is left in the printer; and an on-line lamp 17 to indicate the on-line mode or off-line mode.

Figures 1, 3:
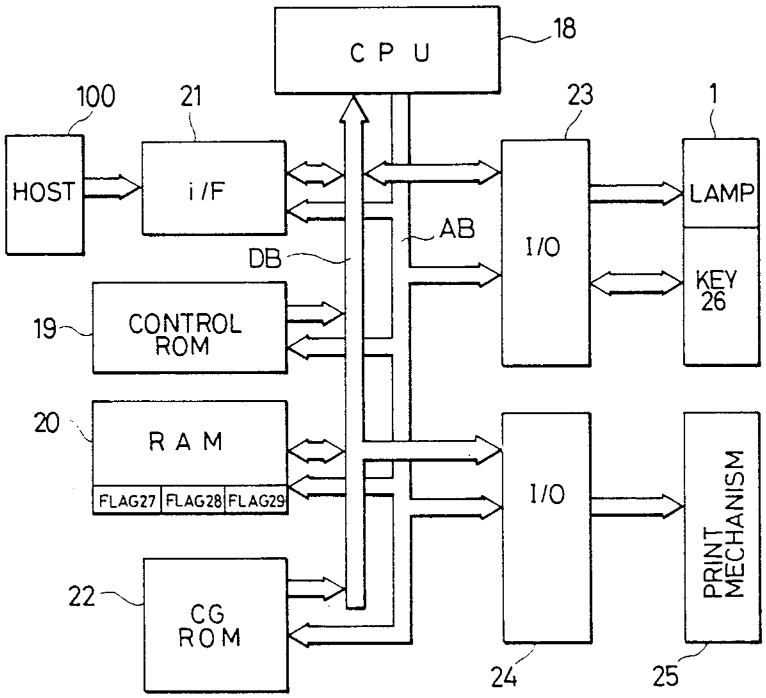
Figures 2, 3:
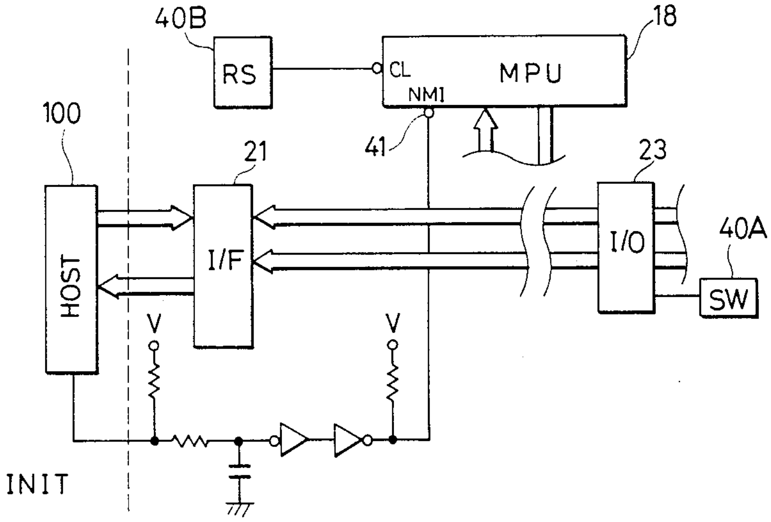

FIG. 3-1 is a block diagram of a system for allowing the invention to function.

A control circuit of the printer according to the invention comprises a CPU, a ROM, a RAM, an I/O port, and the like.

A CPU 18 controls the printer in accordance with the control program stored in a control ROM 19. Practically speaking, the CPU 18 stores the data which is transferred from a host computer 10 through an interface I/F 21 into a reception buffer in a RAM 20. The CPU 18 converts this data into printing characters or the like by a CGROM 22 and stores into a print buffer in the RAM. The data is read out of the print buffer in the RAM and printed by a print mechanism 25 as shown in FIG. 1-2. The input data of a key 26 to change various modes and pitch is read through an I/O port 23 and each mode can be designated. The data which is transmitted from the host computer 100 is printed in the designated mode. In addition, the lamp corresponding to the designated mode is lit through the I/O port 23.

FIG. 3-2 is a diagram for explaining another embodiment and shows the relation between the CPU 18 and the host computer shown in FIG. 3-1.

A key 40A is a switch to switch whether the priority is given to a command from the host or to the keyboard. The power-on reset section 40B is connected to the CPU 18 for providing a clear instruction signal input to the CPU 18.

Further, the recording apparatus is reset when an initial (INIT) signal is supplied from the host computer 100 to an NMI (non-maskable interrupt) terminal 41 of the CPU 18, namely, in the non-maskable state by the interruption of the highest priority.

The initial (INIT) signal and the power-on reset section 40B are separate. The initial signal is input to the NMI terminal of the CPU 18 and the recording apparatus is reset by the interruption routine.

Namely, when the switch 40A is set to the off-line position, so that priority is given to the function of the keys 2, 3, and the like, even if the initial signal to reset the recording apparatus is input from the host computer 100, the apparatus remains in the state in which priority is given to the keyboard function, i.e., this state is not cleared and the set mode is continued without being cancelled.

(OPERATION)

Figure 6:
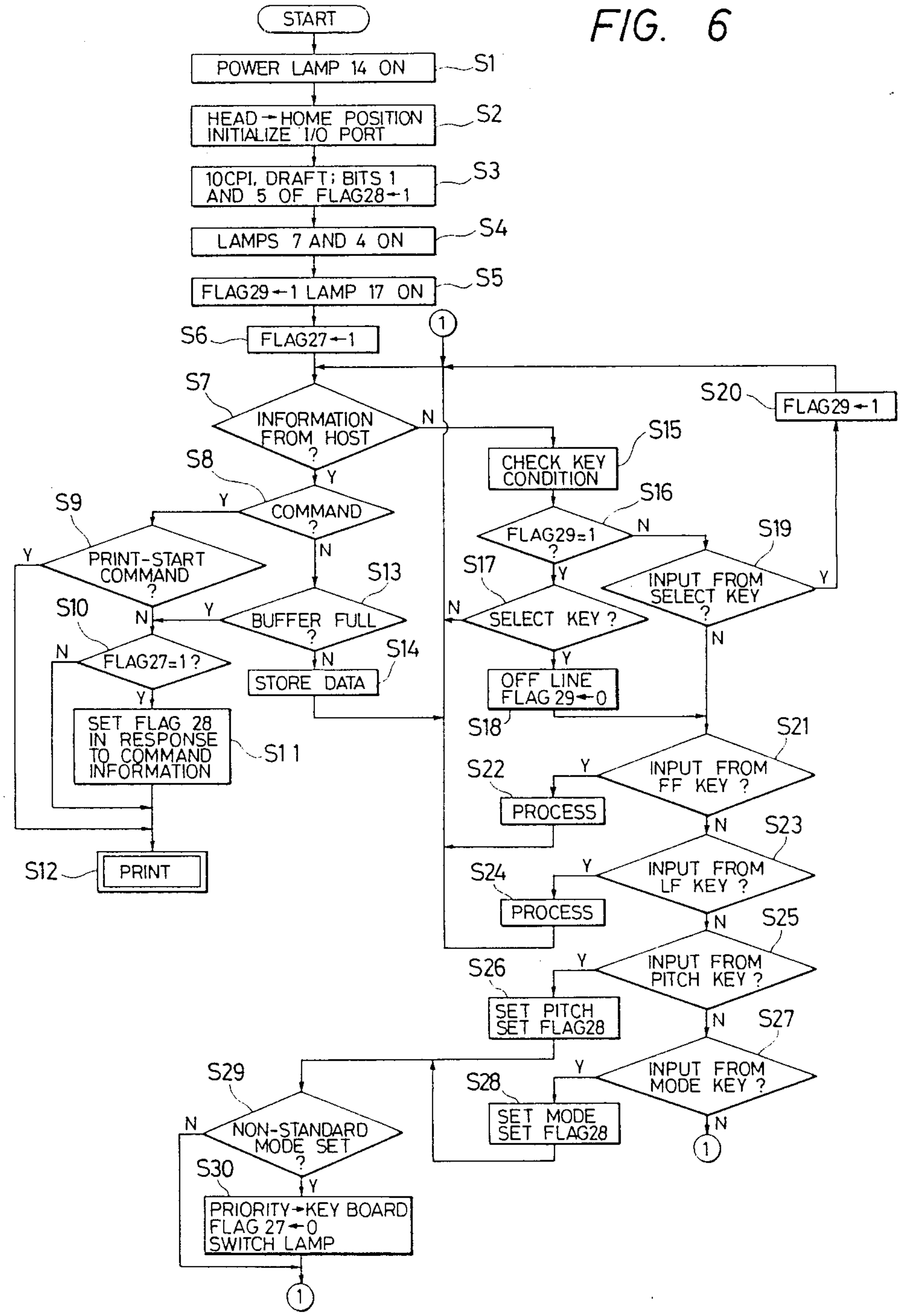
FIG. 6 is a diagram showing a control flowchart of the first embodiment of the present invention.

The operation of the invention will now be described in detail hereinbelow. FIG. 6 is a flowchart showing an example of the control program stored in the ROM 19 in FIG. 3-1.

The operation will be described hereinbelow with reference to FIG. 6. When the power supply of the printer is turned on, the power lamp 14 in FIG. 2 is lit (step S1). The initializing operations of the print mechanism such that the print head is moved to the home position and the like are executed through an I/O port 24 (step S2). Then, the print pitch and printing mode are set to the standard pitch and mode such as 10 cpi and draft mode which are ordinarily used (step S3). The lamps 7 and 4 are lit (step S4). A flag 29 indicative of the on-line mode in the RAM 20 is set to "1" and the on-line lamp 17 is lit (step S5). The apparatus is set to the operation mode in which the data and command from the host computer 100 can be received through the interface I/F 21 (step S6). In this case, a flag 27 is provided in the RAM 20 and the flag 27 indicates whether the print pitch and printing mode are preferentially set by commands from the host computer 100 or by the key inputs from the operation panel 1.

In the standard mode of 10 cpi and draft print, the flag 27, to give priority to the commands, is set to "1". When data and commands are input from the host computer in this state, the CPU designates the flag 27 in the RAM 20 by an address bus AB and reads out the flag 27 by a data bus DB. When the CPU confirms that the flag 27 is set to "1", the CPU instructs the execution of the printing in accordance with the command from the host computer.

Figure 4:
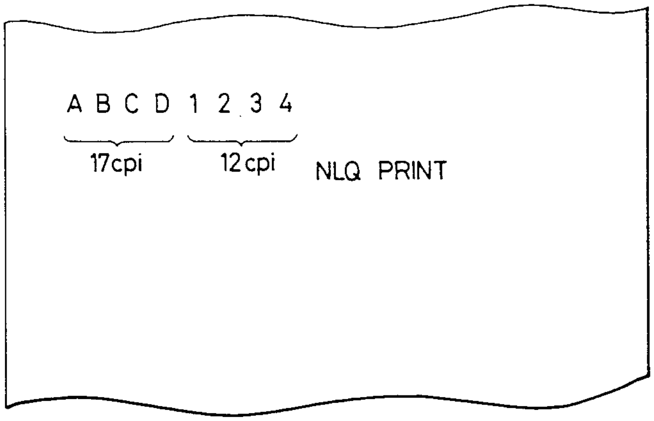
FIG. 4 is a diagram showing a print sample for explaining the embodiment.

Therefore, for example, when the data of "A B C D" is transferred from the host computer while designating the print pitch of 17 cpi, and then the data of "1 2 3 4 5" and the commands of CR (carriage return) and LF (line feed) are transferred from the host computer while designating the print pitch of 12 cpi and the printing mode NLQ, the data of "A B C D" is printed in the draft mode at the print pitch of 17 cpi and the data of "1 2 3 4 5" is then printed on the same line in the NLQ printing mode and at the print pitch of 12 cpi, and thereafter the line feed is executed (FIG. 4).

Figure 5A:
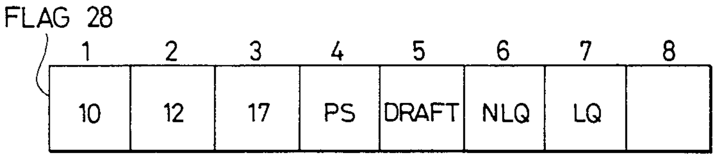
FIG. 5A is a diagram showing the content of a flag 28.

A flag 28 of one byte as shown in FIG. 5A is provided in the RAM 20. The flag 28 is used to check at which print pitch and in which printing mode the printing is performed when the recording apparatus prints data. Various kinds of printing operations can be performed by checking the flag 28. One byte of an address in the RAM 20 is assigned to the flag 28. As shown in FIG. 5A, bits 1 to 4 are assigned as a flag to designate the print pitch 10 cpi, 12 cpi, 17 cpi, or PS and bits 5 to 7 are assigned as a flag to designate the printing mode of draft, NLQ, or LQ. When the flag is set to "1", the print pitch or printing mode corresponding to this flag is designated. In the invention, LQ denotes the print quality higher than the NLQ; therefore, it may be replaced by NLQ+. Namely, in the case of the draft mode and 10 cpi, bits 1 and 5 in the flag 28 are set to "1". As shown in the foregoing example, when the moving speed of the carriage varies because the print pitch and printing mode are changed within one line, the print command concerned with the change is received and interpreted and the printing is executed.

In execution of the printing, the CPU always checks the flag 28 to detect the print pitch and desired printing mode and changes the print timing, carriage speed, and the like in accordance with the detected print pitch and printing mode, thereby executing the printing. Therefore, before execution of the printing, the flag 28 needs to be changed in accordance with the printing. For example, in the foregoing example, the flag 28 (bit 3) to designate the print pitch of 17 cpi is set to "1" and when the next command to designate the print pitch of 12 cpi is input (steps S7 and S8), the print pitch and carriage speed are changed; therefore, the printing is executed (in the draft printing mode since the command to designate the printing mode is not input) (steps S9 to S12). Next, bits 2 and 6 of the flag 28 to designate the print pitch of 12 cpi and the NLQ printing mode are set to "1" and the other bits are set to "0" (step S11). In response to the CR (carriage return) command, the data is printed at the print pitch of 12 cpi and in the NLQ printing mode (the printing is started by the CR command).

Figure 5B:
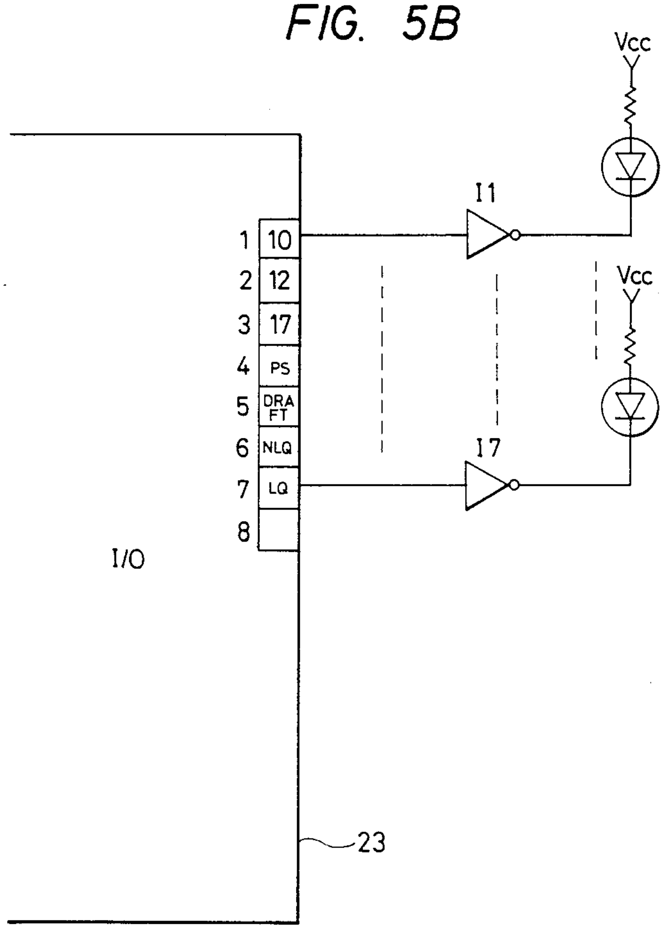
FIG. 5B is a diagram showing a lamp lighting circuit of an I/O port 23.

The lamps are lit by outputting the flag 28 designating the print pitch and printing mode. One byte of the flag 28, in which the pitch flag and mode flag are set to "1" in the RAM 20, is designated by the address bus AB and read out by the data bus DB. The area of one byte of the I/O port 23 is designated by the address bus AB and the data of the flag 28 is output through the data bus DB into this area. The outputs of the I/O port 23 are transmitted through inverters $I_1$ to $I_7$ and light up the lamps connected thereto. Therefore, as shown in FIG. 5B, the printing states and the lamps correspond in a one-to-one relational manner. When the print pitch and printing mode are switched, the lamps to be lit are also switched.

Next, in the on-line mode after completion of the printing, since the flag 29 is set to "1", only the input from the selection key 11 is validated (steps S15, S16, and S17), so that the recording apparatus is set from the on-line mode to the off-line mode. At this time, the CPU sets the flag 29 to "0" (step S18), thereby enabling the pitch key 3, mode key 2, and the other keys to be input (steps S21 to S27).

Namely, the CPU allows the key input data to be read on the basis of the flag 29.

In the standard mode of 10 cpi and draft mode, the flag 27 is set to "1" and priority is given to the commands from the host computer. However, when the recording apparatus is set to the off-line mode by pressing the selection key 11 (step S18) and a print pitch or printing mode other than the standard pitch or mode is set by operating the pitch or mode key, the CPU automatically switches in a manner such that priority is given to the print pitch or printing mode which is designated by the key input and the flag 27 is set to "0" (steps S28, S29, S30).

For example, when the print pitch of 12 cpi and the NLQ printing mode are designated by the keys, the flag 27 is set to "0" and bits 2 and 6 of the flag 28 are set to "1" (steps S25 to S28).

The sheet feeding operation is also similarly performed by operating the FF (form feed) and LF (line feed) keys (steps S21 to S24).

In this state, the off-line mode is returned to the on-line mode by pressing the selection key 11 (steps S19 to S20). When the commands to return the print pitch and printing mode to 10 cpi and draft mode are transferred together with the data by the host computer, the CPU checks the flag 27 in the RAM 20. In this case, since the flag 27 is set to "0", the CPU recognizes that priority is given to the pitch and mode designated by the keys (step S10) and ignores the commands to designate the print pitch and printing mode which are sent from the host computer. For example, even if the data of "A B C D" is transferred from the host computer at the print pitch of 10 cpi and in the draft mode and the data of "1 2 3 4 5" and the CR and LF commands are transferred from the host computer at the print pitch of 17 cpi and in the NLQ+ mode, the data of "A B C D 1 2 3 4 5" is all printed at the print pitch of 12 cpi and in the NLQ printing mode.

On the other hand, when the content of the flag 28 is changed by designating the pitch or mode, the lamp to be lit is also switched every time the pitch or mode is changed, because the lamps and the operating modes also correspond in a one-to-one relational manner as mentioned above.

In the mode to give priority to the key input data, the on-line mode is changed to the off-line mode by the selection key 11 (step S18). The print pitch of 10 cpi and the draft printing mode are designated by operating the keys (steps S25, S27, and S28). Then, the CPU sets the flag 27 to "1" in the standard pitch and mode and resets the printer so as to give priority to the commands from the host computer instead of the key-in data (steps S29→①→S7→S8→S9→S10→S11). Thus, in the on-line mode, the printing is executed in accordance with the commands from the host computer similarly to the above. Although the standard pitch and mode may be set by the keys 2 and 3 shown in FIG. 2, it is also possible to provide a standard mode key and to designate the print pitch of 10 cpi and draft printing mode by deperessing this key.

The lamps in the on-line mode correspond to the bits of the flag 28 in a one-to-one relational manner and are lit in correspondence to the print pitch and printing mode. However, in the off-line mode, the printer checks whether the flag 27 has been set to "1" or "0" in order to discriminate whether the printing operation has been executed by giving the priority to the key input data or to the commands from the host computer. If priority is given to the commands, the bits of the flag 28 to designate the print pitch of 10 cpi and the draft printing mode are set to "1" and the lamps corresponding thereto are lit. If priority is given to the key input data, the flag 28 is held unchanged and the lamps are lit in this state. In this manner, the kind of priority is discriminated.

The print pitch and printing mode have been described above with respect to the case where the priority was given to the key input data. However, in the case of the other mode regarding the printing, e.g., the designation of the paper feed pitch or the like, priority can be also given to the key input data and various kinds of lamps are lit in a manner similar to the above.

As described above, when the power supply is turned on, the operating mode of the printer is set to the standard mode which is ordinarily used. In this mode, the commands from the host computer are validated and the priority is given to the commands. The printing is executed in the designated mode. On the other hand, when a mode other than the standard mode is designated by operating the key on the operation panel, priority is given to the key input data, so that a desired printing mode of the user can be designated by a simple operation and the data can be continuously printed in the desired printing mode.

In the on-line mode, the lamps indicate the present printing state. In the off-line mode, a discrimination to see whether priority is given to the key input data or to the commands can be easily performed by checking the lamps without using any special discriminating lamp. For example, if priority is given to the key input data, the preceding lamp is continuously lit even if the off-line mode is set.

In addition, the standard pitch and mode which are frequently used are preset and this state is used commonly with the state in which priority is given to the commands from the host computer. In the case of the print pitch and printing mode other than the standard pitch and mode, priority is given to the key input data. Therefore, the number of lamps and the like can be reduced.

Figure 7:
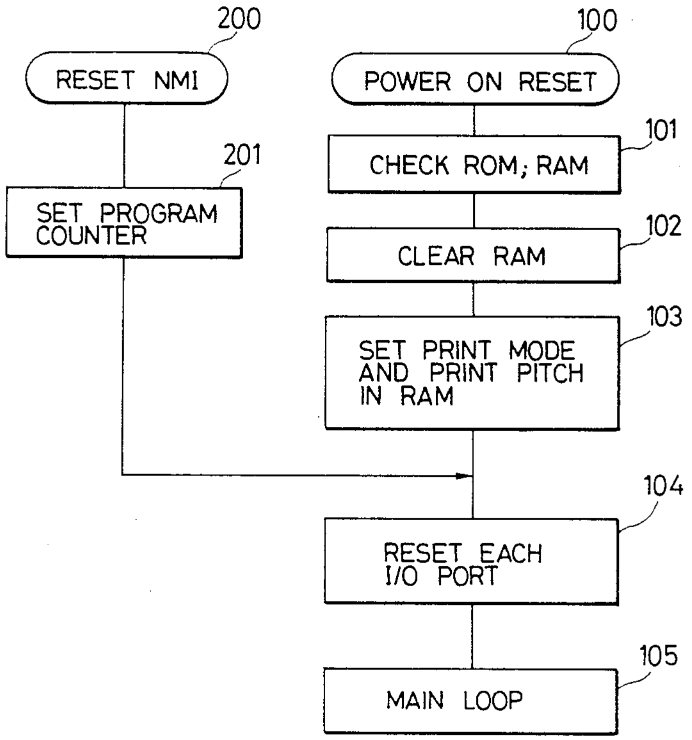
FIG. 7 is a diagram showing a control flowchart according to the second embodiment of the invention.

FIG. 7 is a flowchart showing a procedure for the resetting operation in the interruption routine in another embodiment shown in FIG. 3-2.

In FIG. 7, the power-on reset section 40B is made operative in step 100 and a clear signal is input to the CPU 18. Then, the RAM 20 and ROM 19 are checked in step 101. The RAM 20 is cleared in step 102.

In the next step 103, the printing mode and print pitch (paper feed amount and the like) are designated by the keyboard 1 and stored in the RAM 20.

In step 200, the initial signal is input from the host computer 100 to the NMI terminal 41 of the CPU 18. In step 201, a check is made to see if the switch 40A is switched to the mode in which priority is given to the keyboard. If priority is given to the commands, the processing routine advances to step 101 and the ordinary reset routine is executed. If priority is given to the keyboard, the program counter is set in step 202 and the resetting process is performed by executing the interruption subroutine based on the initial signal without clearing the state in which priority is given to the keyboard function in step 103.

In the next step 104, the I/O ports (interfaces) 21, 23, and 24 are reset. Then, the inherent power-on resetting operation (main routine) is executed in step 105.

According to the foregoing embodiment, if it is sufficient to merely designate the print pitch and printing mode of draft, NLQ, or the like from the keyboard 1 irrespective of the commands from the host computer 100, when the printing mode is limited to the print output mode as, e.g., a printer to output sentences, then even if the program upon output of data from the host computer 100 is constituted such as to transfer the data after the initial (INIT) signal was output, the function setting by the keyboard 1 is maintained without being cancelled. Therefore, there is no need to reset these keyboard function each time. The printer can be certainly reset by the simple operations.

In other words, with this simple constitution, the function of the keyboard 1 and the commands from the host computer 100 can be freely set and made operative by the simple operations.

In the foregoing embodiment, the function of giving priority to the commands or to the keyboard has been switched by operating a switch apart from the keyboard. However, the invention can be also similarly applied to the case where a keyboard switch is used and when a certain function is designated, priority is automatically given to the keyboard.

As will be understood from the above description, according to the invention, in the constitution in which the print pitch and printing mode can be set by the keyboard, the recording apparatus in which the function of the keyboard and the commands from the host computer can freely be simply set and made operative and continued can be obtained.

What is claimed is:

1. A printer for connection to an external apparatus so as to receive information input therefrom, comprising:

setting means for setting information regarding printing to be performed by said printer;

said setting means having a first mode in which said information regarding the printing is designatable irrespective of information which is input from said external apparatus and a second mode in which said information regarding the printing is designated in response to the information which is input from the external apparatus;

deciding means for deciding whether said information regarding the printing has been set to predetermined information by said setting means; and control means for controlling the printer so as to give priority to said first mode in response to a decision by said deciding means that said information regarding the printing has been set to information other than said predetermined information.

2. A printer according to claim 1, further comprising switching means for switchably connecting the printer to the external apparatus, and wherein said setting means is enabled to set said information regarding the printing when the printer is not connected to the external apparatus by said switching means.

3. A printer according to claim 2, wherein said printer receives only the input information of said external apparatus through said switching means when the printer is connected to the external apparatus, and wherein the printer cancels an inhibition of reception of information from the setting means when the printer is not connected to the external apparatus.

4. A printer according to claim 1, wherein said predetermined information defines a standard mode concerned with the printing which includes at least a predetermined print pitch and a predetermined print quality.

5. A printer having a keyboard for setting a print pitch and various kinds of printing modes, comprising:

switching means for switching control of said printer between a first operation to give priority to a command which is transferred from a host computer side over a function which is input from the keyboard and a second operation to ignore said command and to execute a selected one of a plurality of printing modes which is input from the keyboard; and control means for controlling said printer such that when said switching means is switched to give priority to the function input from the keyboard, the set state in which priority is given to the function input from the keyboard is not cleared, and the set state is continued without being cancelled, even when a signal to reset the state of the printer is input from a host computer side.

6. A printer according to claim 5, further comprising second switching means for switchably connecting the printer to the host computer side, and wherein said control means is enabled to set information regarding printing when the printer is not connected to the host computer side by said second switching means.

7. A printer according to claim 5, wherein said control means includes a non-maskable interrupt terminal and a separate clear terminal to reset the printer in response to power-on, and wherein an initial signal from said host computer side is input to said nonmaskable interrupt terminal.

8. A printer for connection to an external apparatus so as to receive at least a print command therefrom, comprising:

an input section for inputting at least print pitch information and print quality information from among a plurality of print commands;

display means for displaying a present print command of said printer;

a switching section for switchably making the printer operative in a selected one of an on-line mode and an off-line mode; and control means for controlling said display means to switch its display content in dependence on whether or not priority is given to a print command of the printer which is input by said input section in the state in which while the printer is set into made operative in the off-line mode by said switching section over a print command received from the external apparatus.

9. A printer according to claim 8, wherein said printer receives the print command from said input section only when the printer is made operative in the off-line mode by said switching section.

10. A printer according to claim 8, further including informing means corresponding to said switching section, wherein said informing means is a lamp which is lit when the printer is made operative in the on-line mode.

* * * * *

UNITED STATES PATENT AND TRADEMARK OFFICE

CERTIFICATE OF CORRECTION

PATENT NO. : 4,891,769

DATED : January 2, 1990

INVENTOR(S) : SHIGEMITSU TASAKI

It is certified that error appears in the above-identified patent and that said Letters Patent is hereby corrected as shown below:

COLUMN 1

Line 32, "or" should read --of--.

COLUMN 3

Line 13, "with a" should be deleted.

COLUMN 10

Line 56, "set" should be deleted.
Line 57, "into" should be deleted.

Signed and Sealed this

Fifteenth Day of October, 1991

*Attest:*

HARRY F. MANBECK, JR.

*Attesting Officer*

*Commissioner of Patents and Trademarks*